United States Patent
Ueda et al.

(10) Patent No.: US 9,555,466 B2
(45) Date of Patent: Jan. 31, 2017

(54) SUBSTRATE JOINING METHOD USING RIVET, AND JOINING STRUCTURE

(75) Inventors: Masahito Ueda, Tokyo (JP); Hiroyuki Hasegawa, Fukui (JP); Kinya Watanabe, Fukui (JP); Naoya Fujii, Fukui (JP)

(73) Assignee: NIHON UNIVERSITY, Tokyo (JP)

( * ) Notice: Subject to any disclaimer, the term of this patent is extended or adjusted under 35 U.S.C. 154(b) by 465 days.

(21) Appl. No.: 14/002,297

(22) PCT Filed: Mar. 1, 2012

(86) PCT No.: PCT/JP2012/001424
§ 371 (c)(1),
(2), (4) Date: Aug. 29, 2013

(87) PCT Pub. No.: WO2012/117737
PCT Pub. Date: Sep. 7, 2012

(65) Prior Publication Data
US 2013/0340239 A1    Dec. 26, 2013

(30) Foreign Application Priority Data
Mar. 2, 2011 (JP) ................................ 2011-045718

(51) Int. Cl.
*B21J 15/02* (2006.01)
*F16B 19/08* (2006.01)
(Continued)

(52) U.S. Cl.
CPC .............. *B21J 15/02* (2013.01); *B21J 15/025* (2013.01); *B29C 65/562* (2013.01);
(Continued)

(58) Field of Classification Search
CPC ...... B29C 65/60; B29C 65/601; B29C 65/602; B29C 66/1122; B29C 66/721; B29C 66/7212; B29C 66/742; B21J 15/02; B21J 15/025; B21J 15/04; B21J 15/046; B21J 15/42; Y10T 29/49956; Y10T 29/49957; Y10T 29/5377
See application file for complete search history.

(56) References Cited

U.S. PATENT DOCUMENTS

| | | | | |
|---|---|---|---|---|
| 2,464,622 | A | * | 3/1949 | Veit .......................... B21J 15/02 29/505 |
| 2,482,391 | A | * | 9/1949 | Webster ................... B21J 15/02 29/509 |

(Continued)

FOREIGN PATENT DOCUMENTS

| | | |
|---|---|---|
| JP | 1-103296 A | 4/1989 |
| JP | 1-228797 A | 9/1989 |

(Continued)

*Primary Examiner* — Christopher M Koehler
(74) *Attorney, Agent, or Firm* — Norris McLaughlin & Marcus, P.A.

(57) ABSTRACT

A joining method includes punching respective laminated plate materials by a rivet shaft portion of a SPR, forming a crimp portion at the front end of the rivet shaft portion, and fastening and joining the laminated plate materials between the rivet head portion and the crimp portion. Washers are laid on and brought into contact with respective opposite surfaces relative to joining surfaces of the laminated plate materials, the washers each having an inner hole through which the rivet shaft portion is allowed to pass, the washers are used as jigs at the time of the punching, the punching by means of the rivet shaft portion is performed along the inner holes of the washers, and the joining is performed so that the washers left between the rivet head and the crimp portion and the opposite surfaces.

10 Claims, 10 Drawing Sheets

(51) Int. Cl.

| | | |
|---|---|---|
| *B29C 65/56* | (2006.01) | |
| *B29C 65/60* | (2006.01) | |
| *B29C 65/74* | (2006.01) | |
| *B29C 65/82* | (2006.01) | |
| *B29C 65/00* | (2006.01) | |
| *F16B 5/04* | (2006.01) | |

(52) U.S. Cl.
CPC ........ *B29C 65/602* (2013.01); *B29C 65/7437* (2013.01); *B29C 65/8253* (2013.01); *B29C 66/1122* (2013.01); *B29C 66/21* (2013.01); *B29C 66/43* (2013.01); *B29C 66/721* (2013.01); *B29C 66/7212* (2013.01); *B29C 66/81422* (2013.01); *B29C 66/81423* (2013.01); *B29C 66/81429* (2013.01); *B29C 66/8322* (2013.01); *F16B 19/08* (2013.01); *F16B 19/086* (2013.01); *B29C 66/72143* (2013.01); *B29C 66/7392* (2013.01); *B29C 66/7394* (2013.01); *F16B 5/04* (2013.01); *Y10T 29/49956* (2015.01)

(56) References Cited

U.S. PATENT DOCUMENTS

| | | | | |
|---|---|---|---|---|
| 3,426,641 | A * | 2/1969 | Rosman | B21J 15/02 29/509 |
| 4,687,395 | A * | 8/1987 | Berecz | B29C 65/601 244/132 |
| 4,687,397 | A * | 8/1987 | Berecz | B29C 65/601 411/361 |
| 4,687,398 | A * | 8/1987 | Berecz | B29C 57/00 244/132 |
| 4,865,792 | A * | 9/1989 | Moyer | B29C 63/0082 156/293 |
| 5,009,557 | A * | 4/1991 | Dessirier | B21J 15/02 29/524.1 |
| 5,191,689 | A * | 3/1993 | Slesinski | B21J 15/046 29/243.517 |
| 5,361,483 | A * | 11/1994 | Rainville | B29C 66/7394 29/524.1 |
| 5,390,407 | A * | 2/1995 | Musil | B29C 66/92653 29/243.5 |
| 6,161,714 | A * | 12/2000 | Matsuura | B62D 29/045 220/1.5 |
| 2004/0164124 | A1* | 8/2004 | Lundstrom | B21J 15/08 228/135 |
| 2006/0067806 | A1* | 3/2006 | Denslow | F16B 5/04 411/504 |
| 2010/0272954 | A1* | 10/2010 | Roming | B64C 1/064 428/138 |
| 2012/0260490 | A1* | 10/2012 | Sakoda | F16B 19/1045 29/525.06 |
| 2013/0000101 | A1* | 1/2013 | Rintelmann | F16B 19/00 29/525.03 |
| 2014/0369785 | A1* | 12/2014 | Revel | F16B 19/04 411/82.5 |
| 2015/0056042 | A1* | 2/2015 | Marxkors | B21J 15/36 411/501 |
| 2015/0212136 | A1* | 7/2015 | Iwaki | B64D 45/02 702/58 |

FOREIGN PATENT DOCUMENTS

| | | |
|---|---|---|
| JP | 2-275104 | 11/1990 |
| JP | 2003-254309 | 9/2003 |
| JP | 2005-69451 | 3/2005 |
| JP | 2005-233413 | 9/2005 |
| JP | 2006-202540 A | 8/2006 |
| JP | 2006-234154 | 9/2006 |
| JP | 2008-303978 A | 12/2008 |
| JP | 2010-014190 | 1/2010 |

* cited by examiner

SUBSTRATE JOINING METHOD USING RIVET, AND JOINING STRUCTURE

TECHNICAL FIELD

The present invention relates to a substrate joining method using a rivet and a joining structure, for punching and joining laminated plate materials, thin plate materials or the like by means of the rivet.

BACKGROUND ART

Carbon fiber reinforced plastic (CFRP) is superior in terms of specific rigidity, specific strength, fatigue property, and corrosive property compared with metal, and is examined to be applied to structural members of automobiles or the like for the sake of weight reduction.

However, there is no method of joining in a short time with ease like spot welding for the metal. This is one of factors to frustrate the weight reduction due to the material substitution.

In this regard, adhesive joining is generally used to join laminated plate materials made of CFRP.

However, there are problems such that an adhesive requires a long time to be hardened in view of productivity in the automobile industry, and joining surfaces require to be processed and cleaned to result in high cost.

Further, there is a problem in heat resistance, influence of moisture absorbent, weakness under cool environment or fast deformation, and the like.

On the other hand, as mechanical joining, rivet joining is used.

However, there are problems such that it requires a long time for a hole making process, and a tool becomes worn early compared with that for metal or the like.

From such a situation, a joining method capable of being carried out in a short time at low cost is highly demanded.

As a conventional joining method in this kind, there is one described in Patent Document 1.

This joining method of Patent Document 3 uses a self-piercing rivet (SPR) that has a rivet head and a hollow rivet body opened at a front end face, to fasten two FRP plates laid one on another.

Namely, a metal plate is brought into firmly contact with a portion of one FRP plate to be fastened, and then the self-piercing rivet (SPR) is driven into both the FRP plates from a portion of the other FRP plate to be fastened so that the rivet head is brought into firmly contact with the portion of the other FRP plate to be fastened. Further, an annular front end of the rivet body that pierces both the FRP plates is put to biting the metal plate and radially expanding. In this way, the FRP plates are joined together between the rivet head and the metal plate.

However, the method drives the rivet body into the metal plate and plastically deforms the metal plate, so that the FRP plates may be separated from each other and get cracked around the rivet body according to the plastic deformation. Therefore, this method has little or no readability and Patent Document 1 has been deemed to be withdrawn.

Further, not only when joining the FRP plates but also when joining thin metal plates or the like, separation may be caused between joining surfaces by driving the rivet body. This is the broadly possible problem in joining laminated plate materials, thin plate materials, or the like by driving a rivet.

Additionally, the joining by driving a rivet may perform spin crimping other than use of the SPR. That is not necessarily possible problem in only the SPR and is the broadly possible problem in joining by driving a rivet.

PRIOR ART DOCUMENT

Patent Document

PATENT DOCUMENT 1:JP 2005-69451 A

SUMMARY OF THE INVENTION

The problem to be solved by the invention is a fact that joining plate materials by driving a rivet causes the plate materials to be separated from each other or get cracked.

The present invention provides a joining method of plate materials using a rivet, capable of joining the plate materials by driving the rivet while suppressing separation or cracks. The joining method is characterized by punching respective plate materials that are laid one on another with joining surfaces being in contact with each other by a rivet shaft portion of a rivet that includes a rivet head portion and the rivet shaft portion, forming a crimp portion at a front end of the rivet shaft portion, and fastening and joining the plate materials between the rivet head portion and the crimp portion, wherein a flat plate seat member is laid on and brought into contact with at least one of opposite surfaces relative to the joining surfaces of the respective plate materials, the seat member having an inner hole through which the rivet shaft portion is allowed to pass, the seat member is used as a supporting jig at the time of the punching to apply a clamping force between the plate materials, the punching by means of the rivet shaft portion is performed along the inner hole of the seat member, and the joining is performed so that the seat member is left between the rivet head portion or the crimp portion and said at least one of the opposite surfaces.

The present invention provides a joining structure of plate materials using a rivet. The joining structure is characterized by plate materials laid one on another with joining surfaces being in contact with each other, a flat plate seat member laid on and brought into contact with at least one of opposite surfaces relative to the joining surfaces of the respective plate materials, the seat member having an inner hole, a rivet including a rivet head portion and a rivet shaft portion, wherein the rivet shaft portion has a crimp portion at a front end thereof punching and piercing the inner hole of the seat member and the respective plate materials, and the seat member is interposed between the crimp portion or the rivet head portion and said at least one of the opposite surfaces to fasten and join the respective plate materials.

The joining method of the plate materials using the rivet according to the present invention, because of the above-mentioned means, uses the seat member having the inner hole as a jig at the time of the punching, to surely carry out the punching by means of the rivet and suppress stress concentration and the like generated in the plate materials by the rivet. This suppresses separation or cracks of the plate materials at the time of the punching.

After the joining, the seat member is left to prevent progress of separation or cracks that may be generated around a pierced portion by means of the rivet.

The joining structure of the plate materials using the rivet according to the present invention, because of the above-mentioned means, prevents progress of separation or cracks that may be generated around a pierced portion by means of the rivet after the fastening and the joining.

BRIEF DESCRIPTION OF THE DRAWINGS

FIGS. 4(A) to (E) are sectional views illustrating a joining process in which FIG. 4(A) is a waiting step, FIG. 4(B) a punching start step, FIG. 4(C) a punching middle step, FIG. 4(D) a punching finish step, and FIG. 4(E) a state after joining;

FIGS. 6(A) and (B) are sectional observation photographs in which FIG. 6(A) is a case with washers and FIG. 6(B) a case without washers;

EMBODIMENTS FOR CARRYING OUT THE INVENTION

The object that is to be able to join plate materials by driving a rivet while suppressing separation or cracks is achieved by laying flat plate washers having inner holes through which a rivet shaft portion is allowed to pass on respective opposite surfaces relative to joining surfaces of laminated plate materials and bringing them into contact therewith, applying a clamping force between the laminated plate materials using the washers as supporting jigs at the time of punching, performing the punching by means of a rivet shaft portion along the inner holes of the washers, and performing the joining while leaving the washers between the opposite surfaces and a rivet head portion and the crimp portion.

Embodiment 1

Figure 1:
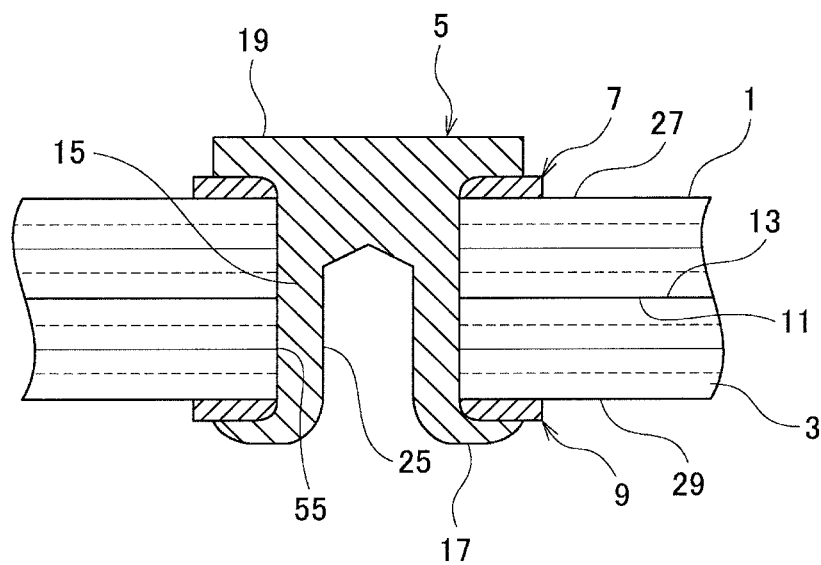
FIG. 1 is a sectional view of a joining structure of plate materials.

FIG. 1 is a sectional view of a joining structure of plate materials. In addition, top and bottom, and left and right are hereinafter assumed as top and bottom, and left and right at the time of punching and joining processes by means of a self-piercing rivet (SPR).

The joining structure of the plate materials uses laminated plate materials 1 and 3 made of, for example, carbon fiber reinforced plastic (CFRP) as plate materials that are fastened and joined together by a SPR 5 through washers 7 and 9 as top and bottom seat members.

The laminated plate materials 1 and 3 are laid one on another with joining surfaces 11 and 13 being in contact with each other, and the washers 7 and 9 are arranged in contact with respective opposite surfaces 27 and 29 relative to the joining surfaces of the plate materials 1 and 3. The washers 7 and 9 each are a doughnut-shaped flat plate having an inner hole 31.

The SPR 5 as the rivet has a rivet, head portion 19 and a rivet shaft portion 15. The rivet shaft portion 15 has a crimp portion 17 at a front end thereof punching and piercing the inner holes 31 of the washers 7 and 9 and the laminated plate materials 1 and 3.

The washers 7 and 9 are interposed between the opposite surfaces 27 and 29 and the rivet head portion 19 and the crimp portion 17, to fasten and join the laminated plate materials 1 and 3.

In addition, the plate materials are not limited to the laminated plate materials. It is applicable to the thin plate materials so that it prevents separation of joining surfaces and the like.

Figure 2:
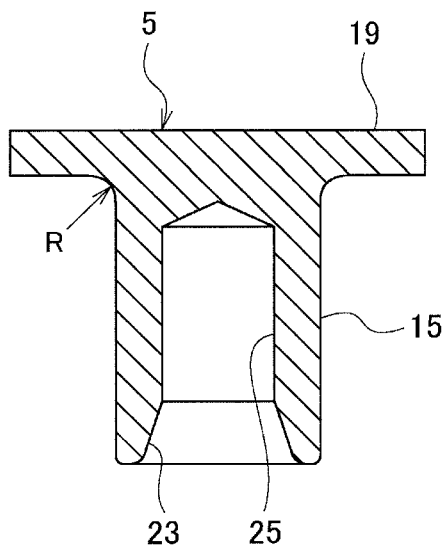
FIG. 2 is a sectional view of a self-piercing rivet.

FIG. 2 is a sectional view of the self-piercing rivet.

As illustrated in FIGS. 1 and 2, the SPR 5 is made of SCM435 in this embodiment and has the rivet head portion 19 and the rivet shaft portion 15. Between a bottom surface of the rivet head portion 19 and a circumferential surface of the rivet shaft portion 15, a curve R is provided in this embodiment depending on working accuracy.

The rivet shaft portion 15 is a hollow shape opened at the front end, a front end inner diameter portion 23 is expanded and opened in the form of a tapered hole, and a back side inner diameter portion 25 has an uniform diameter. In addition, the hollow shape of the rivet shaft portion 15 may be a gradually-tapered hole shape as a whole, as long as the front end inner diameter portion 23 is expanded and opened in the form of the tapered hole.

Figure 3:
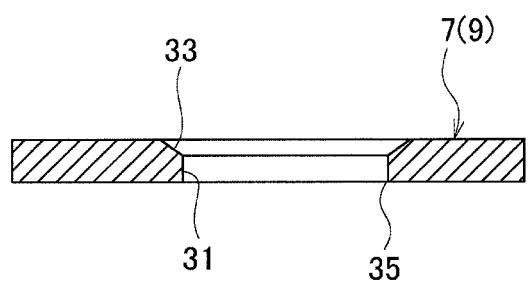
FIG. 3 is a sectional view of a washer.

FIG. 3 is a sectional view of the washer.

As illustrated in FIGS. 1 and 3, the washers 7 and 9, in this embodiment, each are made of metal such as S45C and formed in the doughnut-shaped flat plate as a flat plate. The washer 7 is left between the rivet head portion 19 and the opposite surface 27 of the laminated plate material 1 and the washer 9 is left between the crimp portion 17 and the opposite surface 29 of the laminated plate material 3.

The washers 7 and 9, in this embodiment, are formed in the same sectional shape. The washer 7 will be explained. The washer 7 has the inner hole 31 into which the rivet shaft portion 15 of the SPR 5 is inserted. The inner hole 31 has an inner diameter equal to an outer diameter of the rivet shaft portion 15. With this setting of the diameters, a fastening force and a below-mentioned clamping force are applied up to a circumferential range corresponding to the outer diameter of the rivet shaft portion 15.

For this, it is preferable to minimize a clearance between the outer diameter of the rivet shaft portion 15 and the inner diameter of the inner hole 33 as much as possible. However, it is possible to enlarge the clearance according to demand.

At an edge of the hole 31 on the rivet, head portion 19 side, a chamfered portion 33 is formed. The chamfered portion 33 avoids a contact with the curve R of the SPR 5 to prevent stress concentration. Instead, the chamfered portion 33 may be a curve to avoid the contact. This chamfered portion 33 allows the aforementioned clearance to be minimized as much as possible.

At an edge of the opposite surface 27 of the laminated plate material 1 in the inner hole 31, a corner portion 35 is formed with a right angle in a cross section. The corner portion 35 is for applying the fastening force and the below-mentioned clamping force with respect to the laminated plate material 1 up to the inner diameter of the inner hole 31.

An outer diameter of the washer 7 may be put closer to an outer diameter of the rivet head portion 19 to reduce the amount of a radial protrusion or may be larger to increase the amount of a radial protrusion, as long as the clamping force is transmitted when the clamping force is applied by a below-mentioned holding jig and punch. If the radial protrusion is minimized as much as possible, a contact pressure of the washer 7 with respect to the laminated plate material 1 is increased. If the same is larger, the laminated plate materials 1 and 3 are prevented from bending deformation and progress of damage.

When punching as mentioned below, the outer diameter of the washer 7 is similarly selectable even in a case where a clamping force is not applied.

In a case of the washer 9, the chamfered portion 33 is on the crimp portion 17 side to absorb a contact with the crimp portion 17. Similarly, the corner portion 35 is on the opposite surface 29 side of the laminated plate material 3 for applying the fastening force and the below-mentioned clamping force with respect to the plate material 3 up to the inner diameter of the inner hole 31.

The outer diameter 9 of the washer 9 is selectable from small to large, similar to the washer 7.

In addition, the washers 7 and 9 may be made of different materials, formed in different shapes, and have different inner and outer diameters and thicknesses. The seat member may be made of resin having a hardness that is set so as to demonstrate the fastening force and the below-mentioned clamping force with respect to the laminated plate materials 1 and 3. This seat member made of the resin has an advantage that the inner hole 31 side is scraped off if a misalignment is caused between the rivet shaft portion 15 and the inner hole 31, thereby allowing the seat member to its function directly.

This resin seat member may be made of a resin having a hardness that is set so as to demonstrate the fastening force with respect to the laminated plate materials 1 and 3 even if the clamping force is not applied at the time of the punching.

Figure 4:
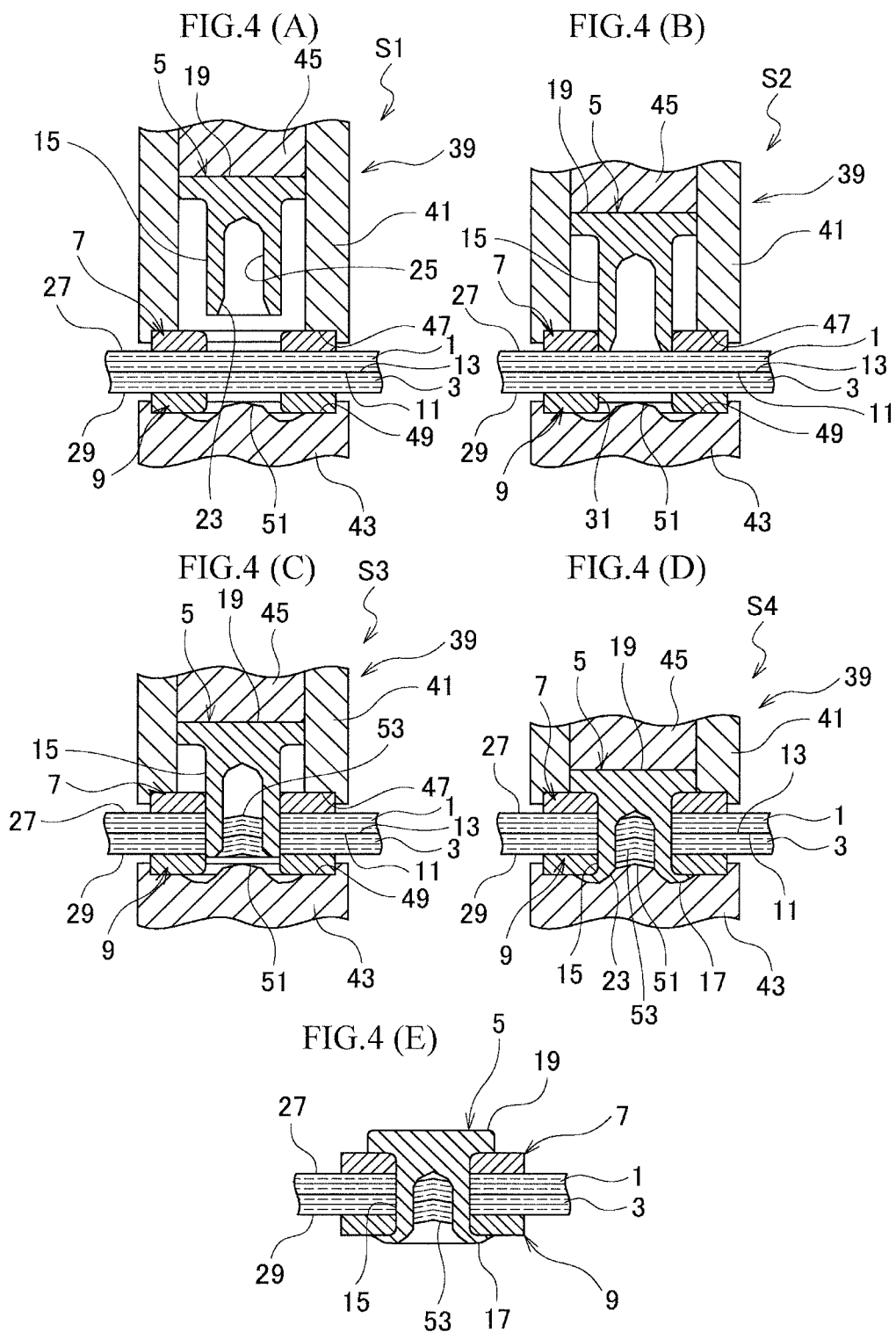

FIG. 4 shows sectional views illustrating a joining process in which (A) is a waiting step, (B) a punching start step, (C) a punching middle step, (D) a punching finish step, and (E) a state after joining.

In the joining process of FIG. 4, a joining apparatus 39 is used. The joining apparatus 39 has an upper holding jig 43 and a lower punch 43. The holding jig 41 is a hollow shape and has a stem 45 that is movable up and down inside the holding jig, and a washer support recessed portion 47 is formed at a bottom end of the holding jig. The punch 43 has a washer support recessed portion 49 formed on a top surface thereof and a crimping guide portion 51 formed at a central portion.

The joining process is performed step by step through a sequence of the waiting step S1, the punching start step S2, the punching middle step S3, and the punching finish step S4 of FIGS. 4(A) to (D).

In the waiting step S1 of FIG. 4(A) before the punching, the washers 7 and 9 are arranged on and brought into contact with the opposite surfaces 27 and 29 of the laminated plate materials 1 and 3 that are laid one on another with the joining surfaces 11 and 33 being brought into contact with each other, the washer 7 is positioned on the washer support recessed portion 47 of the holding jig 43, and the washer 9 is positioned on the washer support recessed portion 49 of the punch 43.

In this state, a pushing force is applied from the holding jig 43 for example, thereby to apply the clamping force between the laminated plate materials 1 and 3 through the washer 7 and 9 that are the supporting jigs at the time of the punching.

In addition, the clamping force may not be applied between the laminated plate materials 5 and 3 through the washers 7 and 9 and may perform the punching of the next step. In this case, a vertical position of a top surface of the washer 7 is detected and a descent position of the holding jig 41 is positioned on the brink of contacting with the washer 7.

In the punching start step S2 of FIG. 4(B), the punching by means of the rivet shaft portion 15 is performed along the inner holes 31 of the washers 7 and 9. The SPR 5 descends following a descent of the stem 45 so that the front end of the rivet shaft portion 15 plunges into the inner hole 31 of the washer 7 and is brought, into contact with the opposite surface 27 of the laminated plate material 1.

At this time, since the washer 7 is positioned with the washer support recessed portion 47 of the holding jig 41 and the SPR 5 is coaxially supported inside the holding jig 41, a center of the inner hole 31 of the washer 7 and a shaft center of the rivet shaft portion 15 are easily aligned with each other, to surely punch the laminated plate materials 1 and 3 by means of the rivet shaft portion 15 aligned with the inner hole 31.

When the SPR 5 further descends, the rivet shaft portion 15 performs a punching operation in a blink in the clamped state with the washers 7 and 9. At this time, the laminated plate materials 1 and 3 is the precision clamped state with the washers 7 and 9, the laminated plate materials 1 and 3 are smoothly sheared due to the clamped state.

When the front end of the rivet shaft portion 15 plunges into the inner hole 31 of the washer 7, the front end of the rivet shaft portion 15 is guided by the chamfered portion 33 of the washer 7 to accurately plunge into the inner hole 31 even if the rivet shaft portion 15 is slightly deviated from the inner hole 31 of the washer 7.

In the punching middle step S3 of FIG. 4(C), the rivet shaft portion 15 punches the laminated plate materials 1 and 3 while relatively guided by the inner hole 31 of the washer 7. A punch waste 53 is accommodated inside the hollow of the rivet shaft portion 15.

In the punching finish step S4 of FIG. 4(D), the front end inner diameter portion 23 of the rivet shaft portion 15 is crimped and guided by the crimping guide portion 51 of the punch 43, thereby forming the crimp portion 17.

At the time of the punching, since an impact force of the rivet head portion 19 is received by the washer 7 as a receiving jig, the laminated plate material 1 is prevented from damage. In particular, since the chamfered portion 33 of the washer 7 avoids a contact with the curve R of the SPR 5, it avoids stress concentration to surely perform the punching.

Since the front end of the rivet shaft portion 15 that is crimped, guided, and curled is received by the washer 9 as a receiving jig, the opposite surface 29 of the laminated plate material 3 never receives scoring force that may occur by the front end directly contacting with a spot. The fastening due to the crimp portion 17 is sufficiently performed without damage of the laminated plate materials 1 and 3.

Therefore, by driving the SPR 5 in a blink according to FIGS. 4(A) to (D), the fastening and joining of the laminated plate materials 1 and 3 using the SPR 5 is completed like spot welding while suppressing generation of separation between the layers, cracks and the like. It realizes the application of the laminated plate materials 1 and 3 to a mass-produced automobile and the like through automatization of the fastening and joining.

In this way, the washers 7 and 9 as the supporting jigs applying the clamping force are left between the rivet head portion 39 and the opposite surface 27 and between the crimp portion 17 and the opposite surface 29 as it is as illustrated in FIG. 4(E), thereby functioning the washers 7 and 9 that keep the fastening force.

In addition, a hollow punch may be used instead of the punch 43 in the waiting step S1, punching start step S2, and punching middle step S3 of FIGS. 4(A) to (C), to discharge the punch waste 53 from a hollow outlet hole. In this case, the punching finish step S4 of FIG. 4(D) replaces the hollow punch with the punch 43 having the crimping guide portion 51 to form the crimp portion 17.

Figure 5:
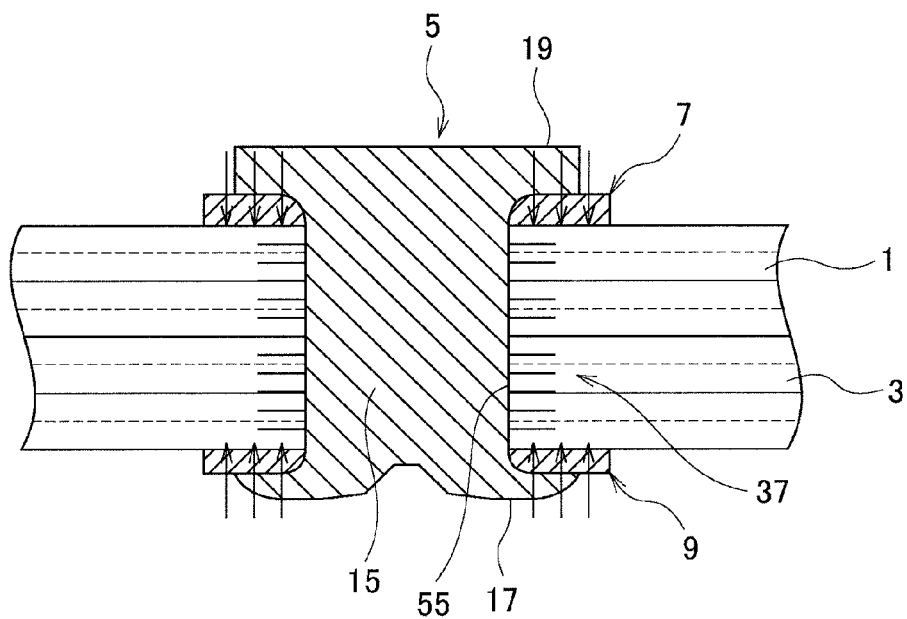
FIG. 5 is a conceptual diagram illustrating fastening force in a joining state.

FIG. 5 is a conceptual diagram illustrating fastening force in the joining state.

As illustrated in FIG. 5, in the joining state, the fastening force is applied up to the outer diameter range of the rivet shaft portion 15 through the washers 7 and 9, thereby suppressing separation 37 between the layers of the laminated plate materials 1 and 3.

Figure 6:
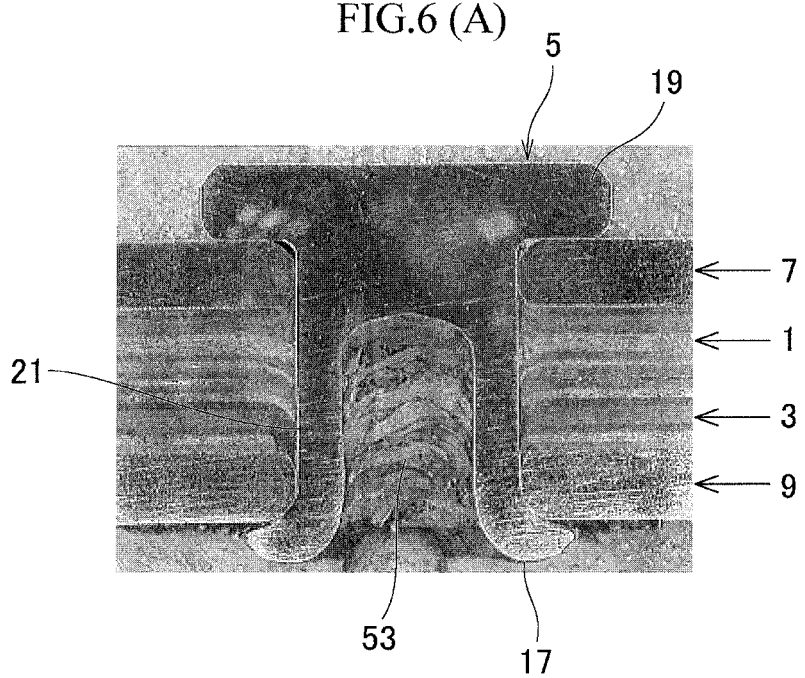
Figure 6:
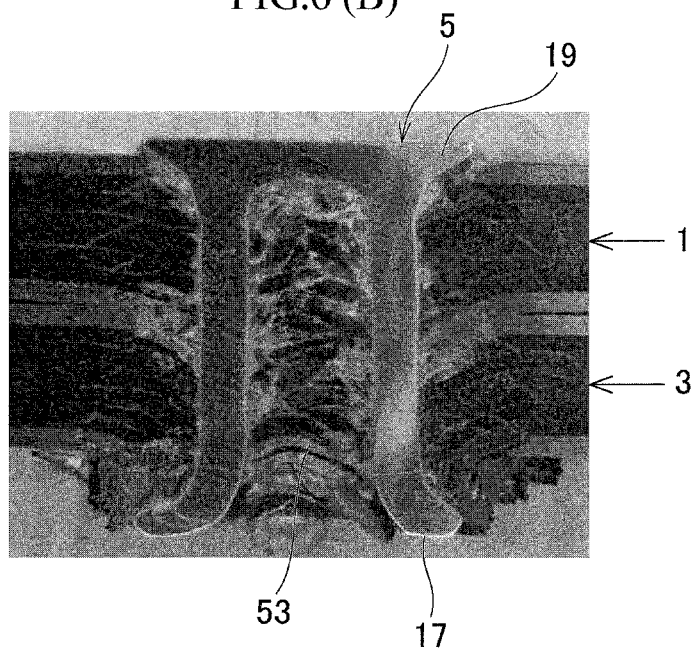

FIG. 6(A) is a sectional observation photograph with washers and (B) is a sectional observation photograph without washers.

FIG. 6(A) shows the sectional observation photograph in which the joining is performed through the steps of FIG. 4 according to the embodiment 1. As is apparent from this sectional observation photograph, although a separation is slightly generated, a measure of the separation is smaller than the diameter of the rivet head portion 19 of the SPR 5.

On the other hand, in a comparative example of FIG. 6(B) without use of washers as supporting jigs, a large separation is caused in the laminated plates 1 and 3 and the amount of a progress of the separation is also large.

From this, by the joining method and joining structure of the plate materials using the rivet according to the embodiment 1 of the present invention, the separation generated on the laminated plate materials (CFRP) 1 and 3 is considerably suppressed so that the laminated plate materials are sufficiently adapted to actual use.

When a fatigue test is conducted with a maximum load of about 60 percents of a tensile strength of a joint, the number of repetitions up to fracture is 8 hundred thousand to 1 million. In view of this, it is possible to sufficiently adapt the laminated plate materials to actual use.

In this test, unidirectional prepreg sheets (T800SC/#2592, Toray Industries. Inc.) are used as the materials. A laminated structure is quasi-isotropic of $[45_2/0_2/-45_2/90_2]_s$ and is formed by an autoclave process. After the formation, a piece with a length of 135 mm and a width of 36 mm is cut off with use of a diamond cutter. A thickness is 1.6 mm.

A shape of the test piece of a single-lap joint used in the fatigue test is based on ASTM D5961/D5 961M-05.

The fatigue test is conducted with use of a hydraulic fatigue tester (8801 INSTRON). A stress ratio is set R=0.1, and a maximum load σmax is set 4.4 KN of about 60 percents or 3.2 KN of about 40 percents of a tensile strength of a joint. A frequency for the test is 2 KHz.

FIG. 7(A) is a C-scan image of a laminated material (CFRP) on a rivet head portion side after punching and (B) is an external photograph of the same. FIG. 8(A) is a C-scan image of a CFRP on a crimp portion side after punching and (B) is an external photograph of the same.

Figure 7:
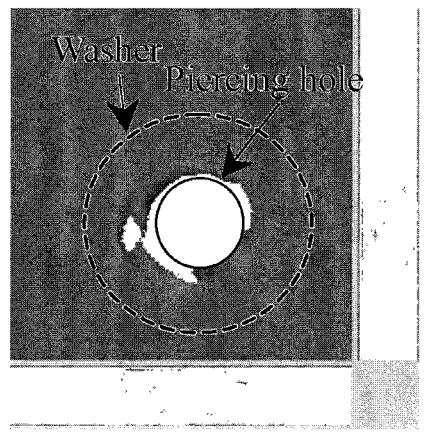
FIG. 7(A) is a C-scan image of a CFRP on a rivet head portion side after punching and FIG. 7(B) is an external photograph of the same.
Figure 7:
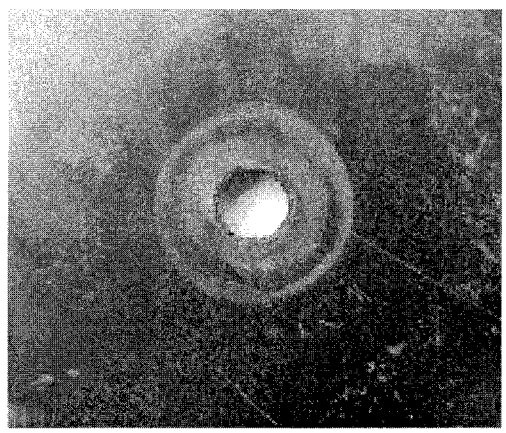
Figure 8:
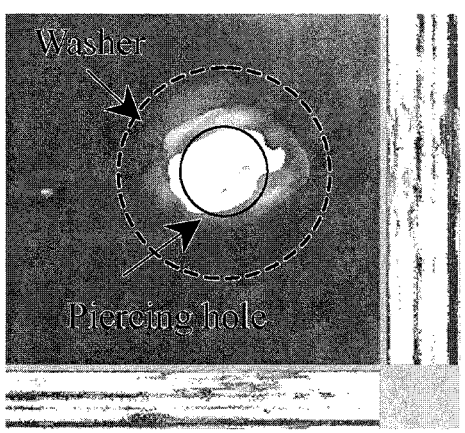
FIG. 8(A) is a C-scan image of a CFRP on a crimp portion side after punching and FIG. 8(B) is an external photograph of the same.
Figure 8:

For the embodiment 1 of the present invention, the SPR 5 is removed after completion of the steps in FIG. 4 and the C-scan image of separation in the vicinity of a pierced portion 55 is obtained with use of a supersonic flaw detector (SDS-5400R JAPAN KRAUTKRAMER). In FIGS. 7 and 8, continuous lines indicate diameters of the pierced portions and dotted lines indicate diameters of the washers.

As illustrated in FIGS. 7(A) and (B), there is little separation on the laminated plate material (CFPR) on the rivet head portion side (driving side).

As illustrated in FIGS. 8(A) and (B), there is a little separation on the laminated plate material (CFPR) on the crimp portion side (drawing side).

However, these separations are generated only in the vicinity of the pierced portion and are considerably smaller than the diameters of the washers. In addition, according to a visual observation, it can merely see a pressed mark due to the washer on the rivet head portion side and a little whitened portion in the vicinity of the pierced portion.

The joining method according to the embodiment 1 of the present invention includes punching respective laminated plate materials 1 and 3 (CFRP) that are laid one on another with the joining surfaces 11 and 13 being in contact with each other by the rivet shaft portion 15 of the SPR 5 that includes the rivet head portion 19 and the rivet shaft portion 15, forming the crimp portion 17 at the front end of the rivet shaft portion 15, and fastening and joining the laminated plate materials (CFRP) 1 and 3 between the rivet head portion 19 and the crimp portion 37. The flat plate washers 7 and 9 are laid on and brought into contact with the respective opposite surfaces 27 and 29 relative to the joining surfaces of the laminated plate materials (CFRP) 1 and 3, the washers 7 and 9 each having the inner hole 31 through which the rivet shaft portion 15 is allowed to pass, the washers 7 and 9 apply the clamping force between the laminated plate materials (CFRP) 1 and 3 as the supporting jigs at the time of the punching, the punching by means of the rivet shaft portion 15 is performed along the inner holes 31 of the washers 7 and 9, and the joining is performed so that the washers 7 and 9 left between the rivet head 19 or the crimp portion 17 and the opposite surfaces 27 and 29.

Accordingly, the washers 7 and 9 function as the supporting jigs with extremely high accuracy at the time of the punching with use of the rivet shaft portion 15. Further, if the outer diameter of the rivet shaft portion 15 is changed, the washers 7 and 9 having the inner holes 31 that match said outer diameter only have to be used. It is possible to flexibly adapt to design change.

Then, it considerably suppresses separation or cracks generated on the laminated plate materials (CFRP) 1 and 3 even if the punching and joining is conducted using the SPR 5 so that the laminated plate materials are sufficiently adapted to actual use.

In addition, in a case where the washers 7 and 9 are seat members made of resin, the seat members are set so that, while each having a hardness to demonstrate the sufficient clamping force, the inner hole side of the seat members are scraped off if the front end of the rivet shaft portion 15 interferes with the inner holes 31, thereby allowing the rivet shaft portion 15 and the resin seat members to be roughly aligned on some level.

When driving the rivet in the presence of the washers 7 and 9, in particular chamfered portion 33 and the corner portion 35, it suppresses generation of separation, cracks, and the like around the pierced portion 55 of the laminated plate materials 1 and 3 on the periphery of the rivet shaft portion 15.

Namely, the inner diameter of the inner hole 31 is close to the outer diameter of the rivet shaft portion 15 as much as possible to extremely minimize the clearance therebetween as mentioned above, the clamping force is applied up to the inner diameter of the inner hole 31 through the operation of the corner portion 35, and the rivet shaft portion 15 punches the laminated plate materials 1 and 3 in a blink in this application state of the clamping force. Accordingly, it suppresses separation between the layers, cracks, and the like.

Further, as the joining structure, the washers 7 and 9 as the supporting jigs applying the clamping force are left as it is as illustrated in FIG. 4(E), thereby functioning as the washers 7 and 9 to keep the fastening force.

Accordingly, it also increases in durability, and it is possible to be sufficiently adapted to actual use as the number of repetitions up to fracture is 8 hundred thousand to 1 million according to the fatigue test.

Figure 9:
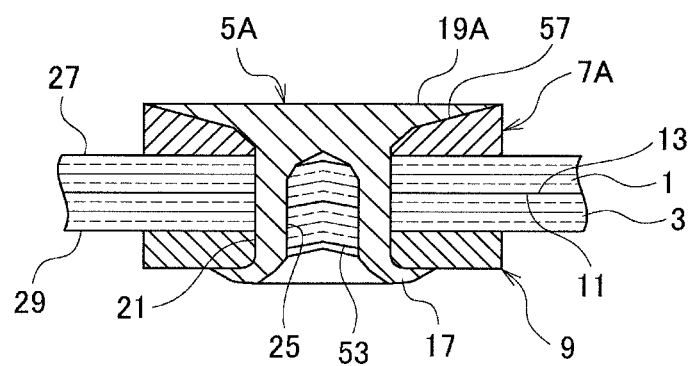
FIG. 9 is a sectional view illustrating a joining structure of plate materials.

FIG. 9 is a sectional view illustrating a joining structure of plate materials according to a modification.

In FIG. 9, the rivet head portion 19A of the SPR 5A is formed in a saucer shape, Therefore, the washer 7A left between the rivet head portion 19A and the opposite surface 27 has a recessed portion 57 on a surface on the rivet head portion 19A side to avoid an interfere with the rivet head portion 19A.

Therefore, it avoids stress concentration, and puts the washer 7A and an outer surface of the rivet head portion 19A flush with each other so that an entire height after the joining is reduced.

FIGS. 10(A) and (B) are sectional views illustrating joining structures of plate materials of a modification according to Embodiment 1 and a comparative example.

In FIG. 10(A), only the washer 9 is used on the crimp portion 17 side of the SPR 5B and no washer is used on the rivet head portion 19B side. At a portion 60 between the bottom surface of the rivet head portion 19B and the circumferential surface of the rivet shaft portion 15B, it avoids stress concentration with respect to the laminated plate material (CFRP) 3 without a curve.

As illustrated in FIG. 10(B), in a case where no washer is used, a front end outer periphery of a rive shaft portion 35 curled by crimping and guiding interferes with and damages the laminated plate material 3 as an encircled part.

Therefore, even if only the washer 9 is used as illustrated in FIG. 10(A), it can expect an effect in view of preventing damage of the laminated plate material 3 due to the crimping.

Further, in the punching step, the washer 9 is used as the supporting jig as mentioned above, so that the clamping force is applied to the laminated plate materials 1 and 3 through the washer 9.

After completion of the joining, the fastening force is applied to the laminated plate materials 1 and 3 between the rivet head portion 39B and the washer 9.

Therefore, it provides the same effects even if only the washer 9 is used.

In addition, the washer 9 may not be used and the washer 7 may be used between the rivet head portion 19B and the opposite surface 27. Even in this case, in the punching step, the washer 7 (See FIG. 1 and FIG. 4) is used as the supporting jig as mentioned above, and the clamping force is applied between the laminated plate materials 1 and 3 through the washer 7 (See FIG. 1 and FIG. 4).

After completion of the joining, the fastening force is applied to the laminated plate materials 1 and 3 between the rivet head portion 19B and the washer 7 (See FIG. 1 and FIG. 4).

FIGS. 11(A) and (B) are sectional views illustrating self-piercing rivets according to modifications.

In FIG. 11(A), a recessed portion 59 is formed on the outer periphery of the SPR 5C and is coated with a flexible resin 61. The flexible resin 61 is led up to the rivet head portion 19C and no curve is provided between the bottom surface of the rivet head portion 19C and the circumferential surface of the rivet shaft portion 15C.

In this modification of the SPR 5C, the flexible resin 61 absorbs a contact with the laminated plate materials 1 and 3 due to thermal expansion or at the time of impact.

Further, since no curve is provided, it allows the chamfered portion 33 of the washer 7 to be omitted.

In FIG. 11(B), a recessed portion 63 is formed on the outer periphery of the SPR 5D and is coated with a flexible resin 65. The flexible resin 65 is formed only on the rivet shaft portion 15D and the curve is provided between the bottom surface of the rivet head portion 19D and the circumferential surface of the rive shaft portion 15D. In addition, in the hollow shape of the rivet shaft portion 15D, the entire inner diameter portion 23D including the front end inner diameter portion is shaped into a gradually-tapered hole.

In this modification, the flexible resin 65 absorbs a contact with the laminated plate materials 1 and 3 due to thermal expansion or at the time of impact.

Embodiment 2

Figure 12:
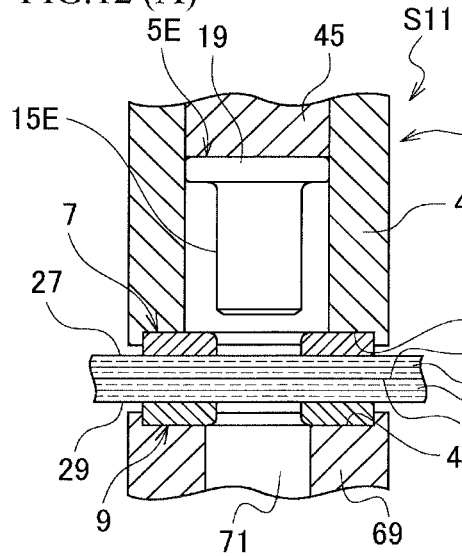
FIGS. 12(A) to (F) are sectional views illustrating a joining process in which (A) is a waiting step, (B) a punching start step, (C) a punching step, (D) a crimp waiting step, (E) a crimping step, and (F) a state after joining.
Figure 12:
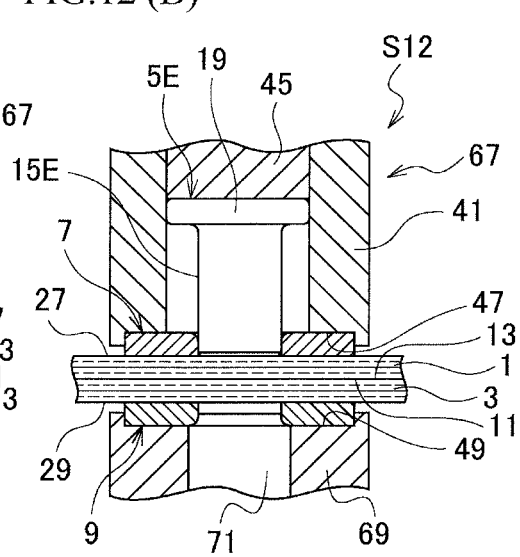
Figure 12:
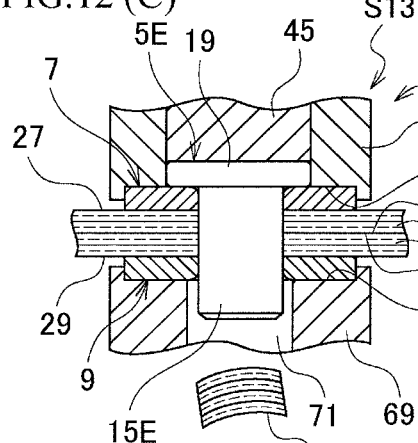
Figure 12:
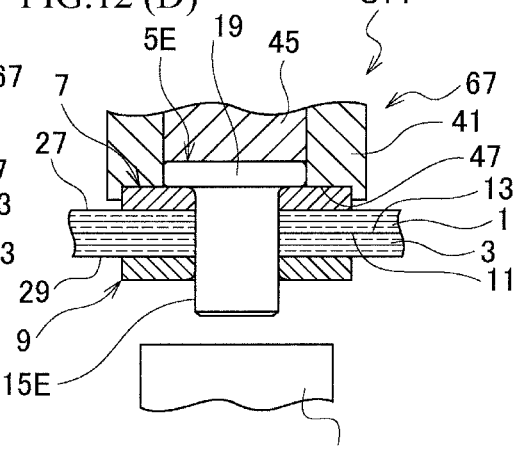
Figure 12:
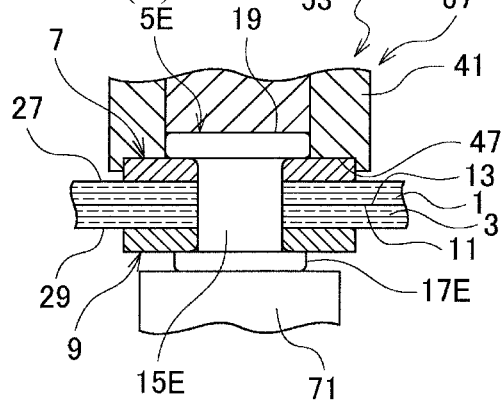
Figure 12:
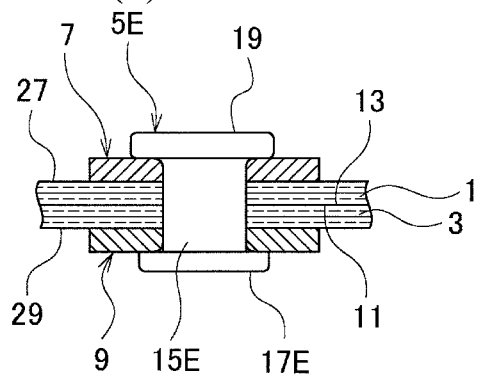

FIG. 12 shows sectional views illustrating a joining process in which (A) is a waiting step, (B) a punching start step, (C) a punching step, (D) a crimp waiting step, (E) a crimping step, and (F) a state after joining.

In a joining method and joining structure of plate materials using a rivet according to this embodiment 2, a rivet shaft portion 15E of a SPR 5D is solid and crimping of the rivet shaft portion 15E is press-crimping or spin-crimping. At an outer periphery of a front edge of the rivet shaft portion 15E is C-chamfered. The C-chamfering may be omitted.

The joining process of FIG. 12 uses a joining apparatus 67. In the joining apparatus 67, a lower punch 69 is changed with respect to the joining apparatus 39 of FIG. 4 and a press punch (or rotary punch) 71 for crimping is used as a replacement for the lower punch 69.

The punch 69 is a hollow shape, has a washer support recessed portion 49 formed on a top surface thereof, and has an outlet hole 71 for a punch waste 53 formed at a central portion thereof.

The joining process is performed step by step through a sequence of the waiting step S11, the punching start step S12, the punching step S13, the crimp waiting step S14, and the crimping step S15 of FIGS. 12(A) to (E).

The waiting step S11 to the punching step S13 of FIGS. 12(A) to (C) approximately correspond to the waiting step S1 before punching to the punching middle step S3 of FIGS. 4(A) to (C).

However, in the embodiment 2, the rivet shaft portion 15E is solid so that the punch waste 33 is discharged through the outlet hole 71 of the punch 69.

In the crimp waiting step S14 of FIG. 12(D), the punch 69 is replaced with the press punch (or rotary punch) 71 so as to be positioned opposite to the rivet shaft portion 15E after the punching.

The crimp waiting step S15 of FIG. 12(E), the press punch (or rotary punch) is ascended (or ascended while rotating) to crimp the front end of the rivet shaft portion 15E and form a crimp portion 17E.

In this way, the washers 7 and 9 applying the clamping force as the supporting jigs are left between the rivet head portion 19 and the opposite surface 27 and between the crimp portion 17E and the opposite surface 29 as it is to function as the washers 7 and 9 that keep the fastening force.

In the case of the joining method of the embodiment 2, it is not as easy as the embodiment 1, but it is suitable for airplanes and the like that require fastening with higher strength and certainty.

Additionally, the present embodiment provide the same effects as those of the aforementioned embodiment.

Embodiment 3

Figure 13:
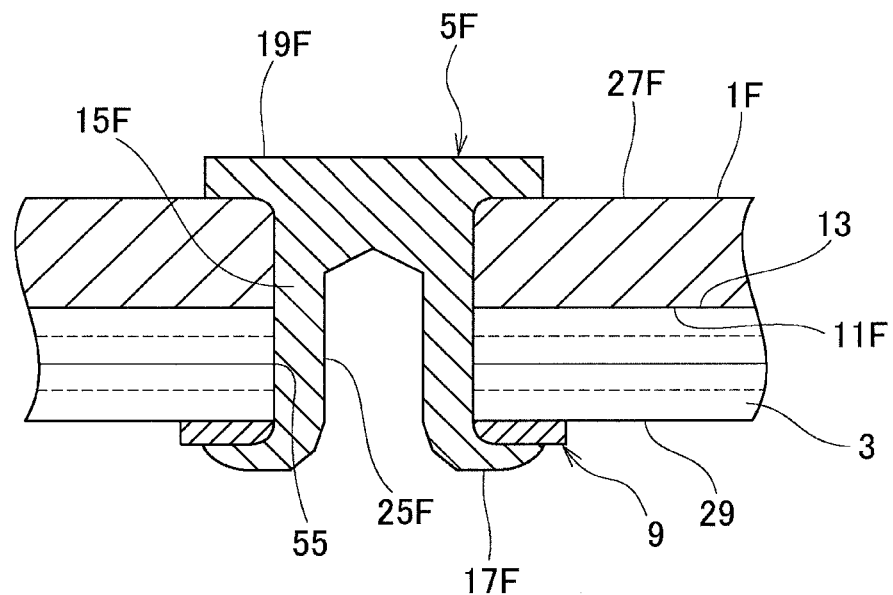
FIG. 13 is a sectional view illustrating a joining structure of plate materials.
Figure 14:
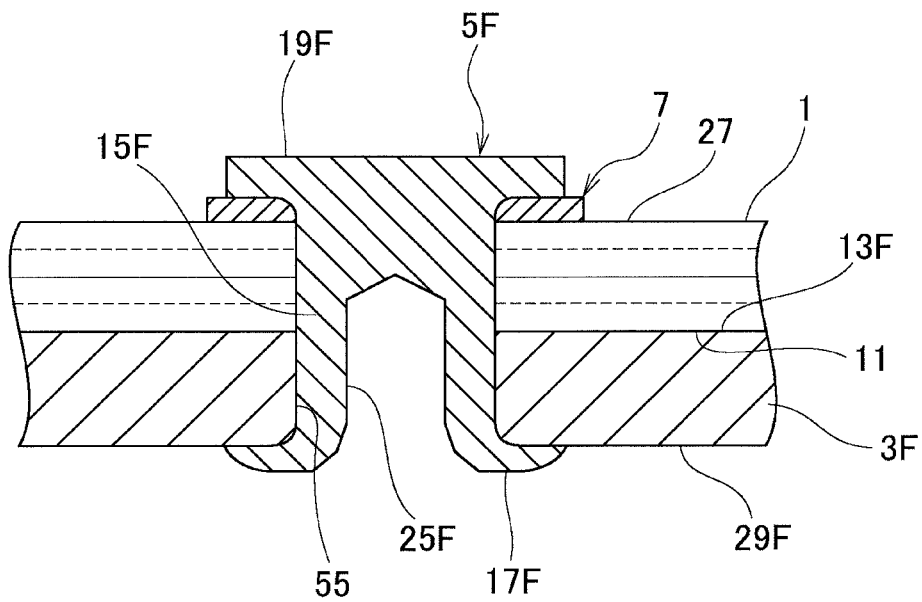
FIG. 14 is a sectional view illustrating a joining structure of plate materials.

FIGS. 13 and 14 are sectional views illustrating a joining structure of plate materials according to the embodiment 3. The basic structure is the same as that, of the embodiment 1, and therefore, the same parts are represented with the same reference numerals and corresponding parts are represented with the same reference numerals with "F" to omit a duplicative explanation.

The joining structure of FIG. 13 uses, for example, a metal plate 3F and a laminated plate material 3 made of carbon fiber reinforced plastic (CFRP) as plate materials joined and fastened together using a SPR 5F through a washer 9 as a bottom seat member. As the metal plate 1F, a steel panel, stainless steel panel, duralumin panel, aluminum alloy panel may be used, but the material is not limited thereto. In addition, a washer as a top seat member on the metal plate 1F side may be concurrently used.

The joining structure of FIG. 14 uses, for example, a laminated plate material 1 made of carbon fiber reinforced plastic (CFRP) and a metal plate 3F as plate materials joined and fastened together using a SPR 5F through a washer 7 as a top seat member. The material of the metal plate 3F is not limited similar to the metal plate 1F. In addition, a washer as a bottom seat member on the metal plate 3F side may be concurrently used.

Figure 10:
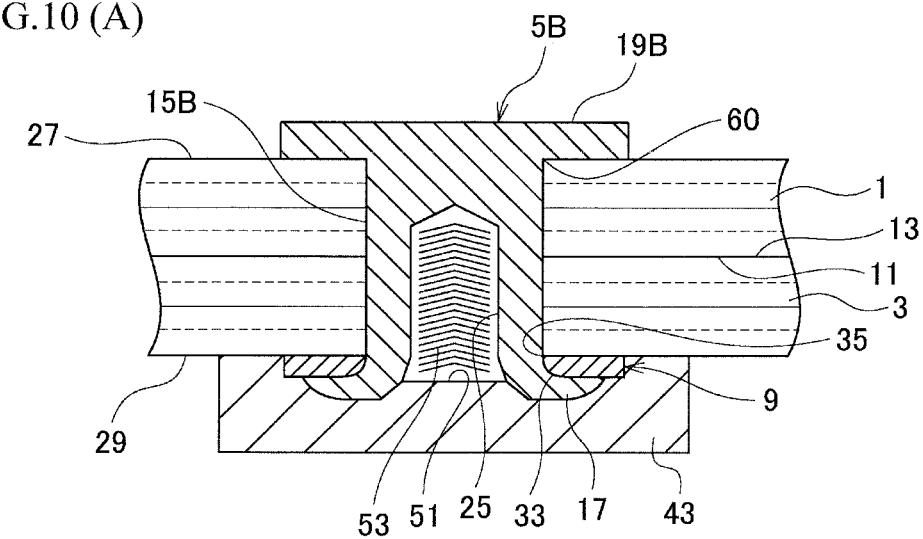
FIGS. 10(A) and (B) are sectional views illustrating joining structures of plate materials of a modification according to Embodiment 1 and a comparative example.
Figure 10:
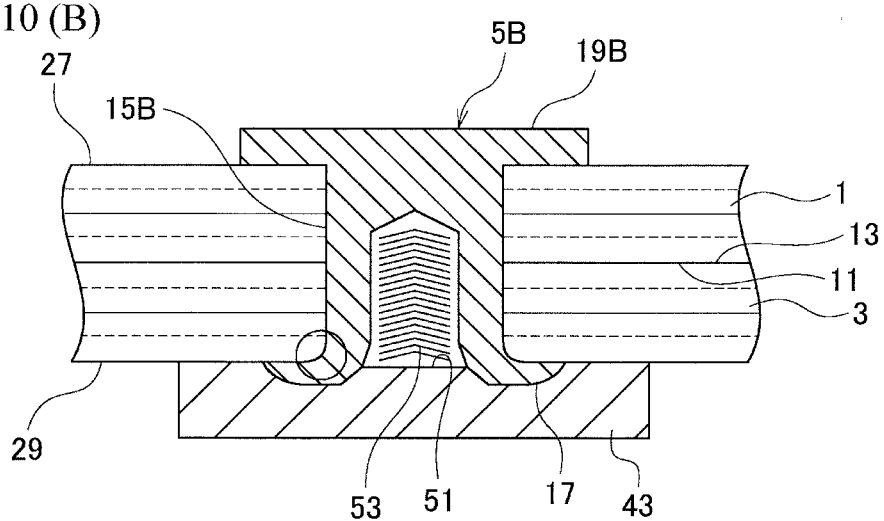
Figure 11:
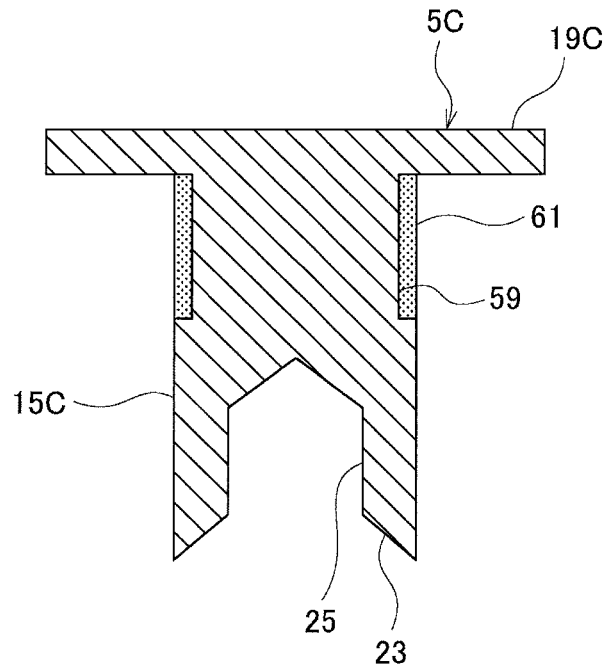
FIGS. 11(A) and (B) are sectional views illustrating self-piercing rivets according to modifications.
Figure 11:
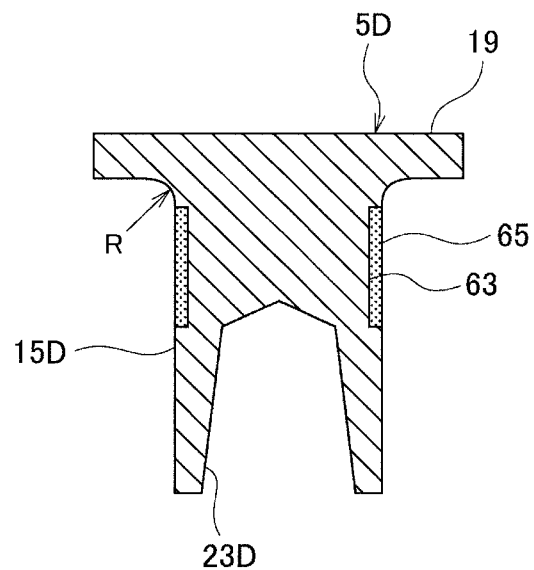

Both the examples of FIGS. 13 and 14 may use the SPR 5A, 5B, 5C and 5D of FIGS. 9, 10 and 11.

The present embodiment also conducts the joining through the joining process of FIG. 4 or FIG. 12. In a case where the joining process of FIG. 4 is applied, it is important that a back side inner diameter portion 25F of the SPR 5F is enlarged as much as possible so that a punched metal part is smoothly accommodated inside the back side inner diameter portion 25F.

At the time of the punching by means of the SPR 5F, in the example of FIG. 13, a joining surface 11F of the metal plate 1F functions as a supporting jig with respect to a joining surface 13 of the laminated plate material 3. In the example of FIG. 14, a joining surface 13F of the metal plate 3F functions as a supporting jig with respect to a joining surface 11 of the laminated plate material 1.

In the example of FIG. 14, if the SPR 5B or 5C of FIG. 10 or 11 is employed, the washer 7 becomes unnecessary.

Figure 15:
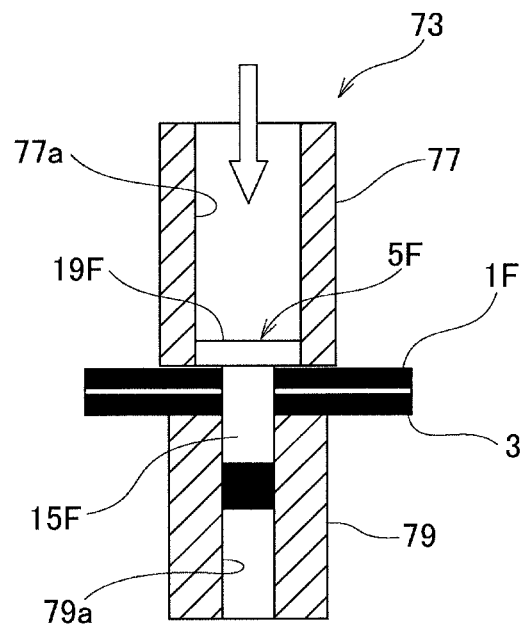
FIG. 15 is a sectional view illustrating a first joining apparatus in the punching step of the joining process.
Figure 16:
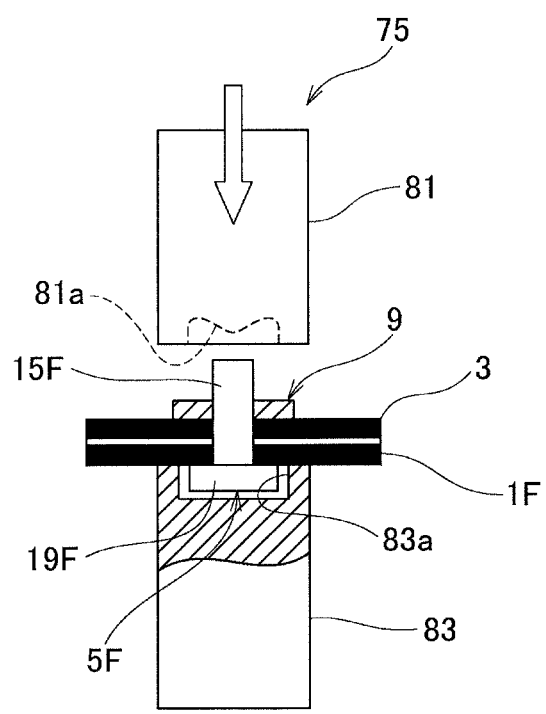
FIG. 16 is a sectional view illustrating a second joining apparatus in the crimping step of the joining process.

In this embodiment, a joining process as illustrated in FIGS. 15 and 16 may be employed. In this joining process, first and second joining apparatuses 73 and 75 are used.

The first joining apparatus 73 is to conduct the punching process and has a work holding member 77 and a lower mold 79. The holding member 77 is a hollow shape and an inner hole 77a thereof has an inner diameter equal to outer diameters of a stem (not illustrated) and a rivet head portion 19F of the SPR 5F. An inner hole 79a of the lower mold 79 has an inner diameter equal to the rivet shaft portion 15F so that it applies a contact pressure with respect to the laminated plate material 3 up to the vicinity of a pierced hole by means of the rivet shaft portion 15F.

The second joining apparatus 75 has a curl punch 83 and a lower mold 83. The curl punch 81 has a recessed portion 81a at a front end thereof for forming a crimp portion 17F of the SPR 5F. The lower mold 83 has a recessed portion 83a for accommodating the rivet head portion 19F.

After the punching in FIG. 15, the crimp portion 17F (FIG. 13) is formed by the curl punch 81 at the step in FIG. 16.

As is true with the application of FIG. 14, the washer 7 is interposed between the rivet head portion 19F and the laminated plate material 1 at the punching step in FIG. 15 unless the SPR 5B or 5C of FIG. 10 or 11 is employed.

A material and thickness for the washers 7 and 9 is arbitrarily selectable, as long as the washers surely transmit the clamping force.

Further, the washers 7 and 9 may add elastic functions like disc springs to a part other than contact surfaces with respect to the laminated plate materials 1 and 3. For example, it employs a laminated structure of a disc spring and a washer. In this case, it provides an effect to prevent the SPR 5A, 5B, 5C, 5D, 5E, or 5F from getting loose after fastening.

The SPR may have a straight structure with an uniform diameter without the tapered structure at the front end inner diameter portion if a rivet head shaft is a hollow structure.

The applicable plate materials are not limited as long as they are affected by driving a SPR, is not limited to the laminated plate materials made of CFRP, and includes plate materials made of CFPR with short fibers, plate materials made of fiber reinforced plastic such as GFRP, simple plastic plate materials, and metal thin plate materials. It also includes the CFRP or GFRP onto which a metal thin plate is laminated.

The resin for the CFRP and GFRP is any one of thermosetting resin or thermoplastic resin.

The laminated plates made of thermoplastic resin prepreg are hard to cause separation between the layers compared with the laminated plates made of thermosetting resin prepreg. The laminated plates made of fabric prepreg are also hard to cause separation between the layers.

On the other hand, the embodiments use the laminated plates made of thermosetting resin unidirectional prepreg and being easy to separation between the layers.

Therefore, the present invention is also applicable to the laminated plates made of thermoplastic resin unidirectional prepreg and the laminated plates made of fabric prepreg without any difficulty.

When joining the laminated plates made of thermoplastic prepreg, the joining is performed after a SPR and washers are heated so that a melt at a pierced portion due to the SPR and the like is promoted, thereby stopping separation between the layers.

The invention claimed is:

1. A joining method of plate materials comprising:
   punching respective plate materials that are laid one on another with joining surfaces being in contact with each other by a rivet shaft portion of a rivet that includes a rivet head portion and the rivet shaft portion while forming a hole on the plate materials by the rivet shaft portion and immediately inserting the rivet shaft portion into the formed hole;

forming a crimp portion at a front end of the rivet shaft portion; and fastening and joining the plate materials between the rivet head portion and the crimp portion; wherein the plate materials are laminated plate materials made of carbon fiber reinforced plastic, the punching step comprises laying, before forming the hole on the laminated plate materials, flat plate seat members on and bringing the seat members into contact with respective opposite surfaces relative to the joining surfaces of the laminated plate materials laid one on another, each one seat members of the seat members having an inner hole through which the rivet shaft portion is allowed to pass, the inner hole having an inner diameter equal to an outer diameter of the rivet shaft portion and openings in which one opening with said inner diameter is located onto a first face of the seat member being in contact with a corresponding one of the opposite surfaces of the laminated plate materials through which said hole is not formed and the other opening is located onto a second face being opposite to the first surface of the seat member, using the seat members as supporting jigs at the time of the punching and applying a clamping force to the respective laminated plate materials by the seat members including edge sides of the inner holes being in contact with the respective opposite surfaces of the laminated plate materials through which said hole is not formed, driving the rivet shaft portion into the laminated plate materials on which said hole is not formed so as to shear the laminated plate materials along the inner holes of the seat members while applying the clamping force, thereby to perform the formation of the hole on the laminated plate materials and the insertion of the rivet shaft portion into the formed hole, and bringing the rivet head portion into contact with the second face of one of the seat members and causing the front end of the rivet shaft portion to protrude from the opening located onto the second face of the other of the seat members by the driving of the rivet shaft portion, the forming step of the crimp portion forms the crimp portion at the front end of the rivet shaft portion protruding from the opening located onto the second face of said other of the seat members, the crimp portion being in contact with the second face of said other of the seat members, and the fastening and joining step fastens and joins the laminated plate materials to each other according to the forming of the crimp portion so that the seat members are left respectively between the rivet head portion and the crimp portion and the opposite surfaces.

2. The joining method of claim 1, wherein the seat members each have an outer diameter portion larger than an outer diameter of the rivet head portion, and a pushing force of a holding jig is transferred to the outer diameter portions of the seat members, thereby applying the clamping force to the respective plate materials through the seat members.

3. The joining method of claim 1, wherein the seat member between the rivet head portion and the opposite surface or between the crimp portion and the opposite surface has a chamfered portion at an edge of the inner hole on the rivet head portion side or the crimp portion side to avoid a contact with the rivet side, and has a corner portion at an edge of the inner hole on the opposite surface side to apply the clamping force up to the inner diameter of the inner hole.

4. The joining method of claim 1, wherein the rivet shaft portion is a hollow shape with a front end inner diameter portion that is expanded and opened in the form of a tapered hole, and the crimp portion is formed by crimping and guiding the front end inner diameter portion of the rivet shaft portion at the time of the punching.

5. The joining method of claim 1, wherein the rivet shaft portion is a solid shape, and the crimp portion is formed by press-crimping or spin-crimping the rivet shaft portion.

6. The joining method of claim 1, wherein said forming said crimped portion and said punching respective plate materials are performed during a same punch stroke of the rivet shaft portion, in which a die that is pre-positioned under the plate seat members receives a distal end portion of the rivet shaft portion and deflects the distal end portion so as to form the crimped portion at an end portion of the punch stroke.

7. A joining structure of plate materials that are joined comprising:

plate materials that are laminated plate materials made of carbon fiber reinforced plastic and are laid one on another with joining surfaces being in contact with each other;

flat plate seat members being laid on and being in contact with respective opposite surfaces relative to the joining surfaces of the respective laminated plate materials, each one seat member of the seat members having an inner hole that has openings in which one opening is located onto a first face of the seat member being in contact with a corresponding one of the opposite surfaces of the laminated plate materials and the other opening is located onto a second face of the seat member being opposite to the first face;

a rivet including a rivet head portion and a rivet shaft portion; wherein the rivet is made of metal, the rivet head portion has a top face being wholly flat and is in contact with the second face of one of the seat members, the rivet shaft portion has a crimp portion at a front end thereof piercing the inner hole and the respective laminated plate materials and protruding from the opening located onto the second face of the other of the seat members, the crimp portion being in contact with the second face of said other of the seat members, and the seat members are interposed respectively between the crimp portion and the rivet head portion and the opposite surfaces of the laminated plate materials to fasten and join the respective plate materials.

8. A joining method of plate materials comprising:

punching respective plate materials that are laid one on another with joining surfaces being in contact with each other by a rivet shaft portion of a rivet that includes a rivet head portion and the rivet shaft portion while forming a hole on the plate materials by the rivet shaft portion and immediately inserting the rivet shaft portion into the formed hole, the hole having openings on each plate material in which one opening is located onto the joining surface of the plate material and the other opening is located onto an opposite surface of the plate material relative to the joining surface;

forming a crimp portion at a front end of the rivet shaft portion; and fastening and joining the plate materials between the rivet head portion and the crimp portion; wherein one of the plate materials is a laminated plate material made of carbon fiber reinforced plastic and the other of the plate materials is a metal plate, the punching step comprises laying, before forming the hole on the plate materials, a flat plate seat member on and bringing the seat members into contact with the opposite surface of the laminated plate material of the plate materials laid one on another, the seat member having an inner hole through which the rivet shaft portion is allowed to pass, the inner hole having an inner diameter equal to the rivet shaft portion and openings in which one opening with said inner diameter is located onto a first face of the seat member being in contact with the opposite surface of the laminated plate material through which said hole is not formed and the other opening is located onto a second face being opposite to the first surface of the seat member, using the seat member as a supporting jig at the time of the punching and applying a clamping force to the laminated plate material by the seat member including an edge side of the inner hole being in contact with the opposite surface of the laminated plate material through which said hole is not formed, driving the rivet shaft portion into the plate materials through which said hole is not formed so as to shear the laminated plate material and the metal plate along the inner hole of the seat member while applying the clamping force, thereby to perform the formation of the hole on the plate materials and the insertion of the rivet shaft portion into the formed hole, and bringing the rivet head portion into contact with one of the second face of the seat member and the opposite surface of the metal plate and causing the front end of the rivet shaft portion to protrude from the opening located onto the other of the second face of the seat member and the opposite surface of the metal plate by the driving of the rivet shaft portion, the forming step of the crimp portion forms the crimp portion at the front end of the rivet shaft portion protruding from the opening of said other of the second face of the seat member and the opposite surface of the metal plate, the crimp portion being in contact with said other of the second face of the seat member and the opposite surface of the metal plate, and the fastening and joining step fastens and joins the plate materials to each other according to the forming of the crimp portion so that the seat member is left between the rivet head portion or the crimp portion and the opposite surface of the laminated plate material.

9. A joining method of plate materials comprising:

punching respective plate materials that are laid one on another with joining surfaces being in contact with each other by a rivet shaft portion of a rivet that includes a rivet head portion and the rivet shaft portion while forming a hole on the plate materials by the rivet shaft portion and immediately inserting the rivet shaft portion into the formed hole, the hole having openings on each plate material in which one opening is onto the joining surface of the plate material and the other opening is onto an opposite surface of the plate material relative to the joining surface;

forming a crimp portion at a front end of the rivet shaft portion; and fastening and joining the plate materials between the rivet head portion and the crimp portion; wherein one of the plate materials that is on the rivet head portion side is a metal plate and the other of the plate materials is a laminated plate material made of carbon fiber reinforced plastic, a portion between a bottom surface of the rivet head portion and a circumferential surface of the rivet shaft portion has a right angle without a curve, the punching step comprises, bringing, before forming the hole on the plate materials, the opposite surface of the laminated plate material of the plate materials laid one on another into contact with a lower mold having an inner hole through which the rivet shaft portion is allowed to pass, the inner hole having an inner diameter equal to the rivet shaft portion and an opening with said inner diameter that is brought into contact with the opposite surface the laminated plate material on which said hole is not formed, using the metal plate as a supporting jig at the time of the punching and applying a clamping force to the laminated plate material between the metal plate and the lower mold by the lower mold including an edge side of the inner hole being in contact with the opposite surface of the laminated plate material on which said hole is not formed, driving the rivet shaft portion into the plate materials on which said hole is not formed from an opposite surface of the metal plate relative to the joining surface thereof so as to shear the laminated plate material and the metal plate along the inner hole of the lower mold while applying the clamping force, thereby to perform the formation of the hole on the plate materials and the insertion of the rivet shaft portion into the formed hole, and bringing the rivet head portion into contact with the opposite surface of the metal plate and causing the front end of the rivet shaft portion to protrude from the opening located onto the opposite surface of the laminated plate material by the driving of the rivet shaft portion, the forming step of the crimp portion comprises fitting a seat member having an inner hole that has openings in which one opening is located onto a first face of the seat member being in contact with the opposite surface of the laminated plate material and the other opening is located onto a second face being opposite to the first surface of the seat member to a part of the rivet shaft portion protruding from the opening located into the opposite surface of the laminated plate material, causing the front end of the rivet shaft portion to protrude from the opening located onto the second face of the seat member with the fitting, and forming the crimp portion being in contact with the opposite surface of the laminated plate material at the front end of the rivet shaft portion protruding from the opening located onto the second face of the seat member.

10. A joining structure of plate materials that are joined, comprising:

a laminated plate material made of carbon fiber reinforced plastic and a metal plate laid one on another with joining surfaces being in contact with each other;

a hole having openings on each of the laminated plate material and the metal plate in which one opening is located onto the joining surface and the other opening is located onto an opposite surface relative to the joining surface;

a flat plate seat member being laid on and being in contact with the opposite surface of the laminated plate material relative to the joining surface thereof, the seat member having an inner hole that has openings in which one opening is located onto a first face of the seat member being in contact with the opposite surface of the laminated plate material and the other is located onto a second face of the seat member opposite to the first face;

a rivet including a rivet head portion and a rivet shaft portion; wherein the rivet is made of metal, the rivet head portion has a top face being wholly flat and is in contact with the opposite surface of the metal plate, the rivet shaft portion has a crimp portion at a front end thereof piercing the inner hole of the seat member, the laminated plate material, and the metal plate and protruding from the opening located onto the second face of the seat member, the crimp portion being in contact with the second face of the seat member, and the seat member is interposed only between the crimp portion and the opposite surface of the laminated plate material to fasten and join the laminated plate material and metal plate.

* * * * *

UNITED STATES PATENT AND TRADEMARK OFFICE
CERTIFICATE OF CORRECTION

PATENT NO. : 9,555,466 B2
APPLICATION NO. : 14/002297
DATED : January 31, 2017
INVENTOR(S) : Masahito Ueda et al.

It is certified that error appears in the above-identified patent and that said Letters Patent is hereby corrected as shown below:

In the Claims

Column 16, Claim 9, Line 22 should be corrected as follows:
From:
". . . the opposite surface the laminated plate material . . ."
To:
--. . . the opposite surface of the laminated plate material . . .--
and, Column 16, Claim 9, Line 54 should be corrected as follows:
From:
". . . the opening located into the opposite surface . . ."
To:
--. . . the opening located onto the opposite surface . . .--

Signed and Sealed this
Ninth Day of May, 2017

Michelle K. Lee
*Director of the United States Patent and Trademark Office*